United States Patent Office 2,908,545
Patented Oct. 13, 1959

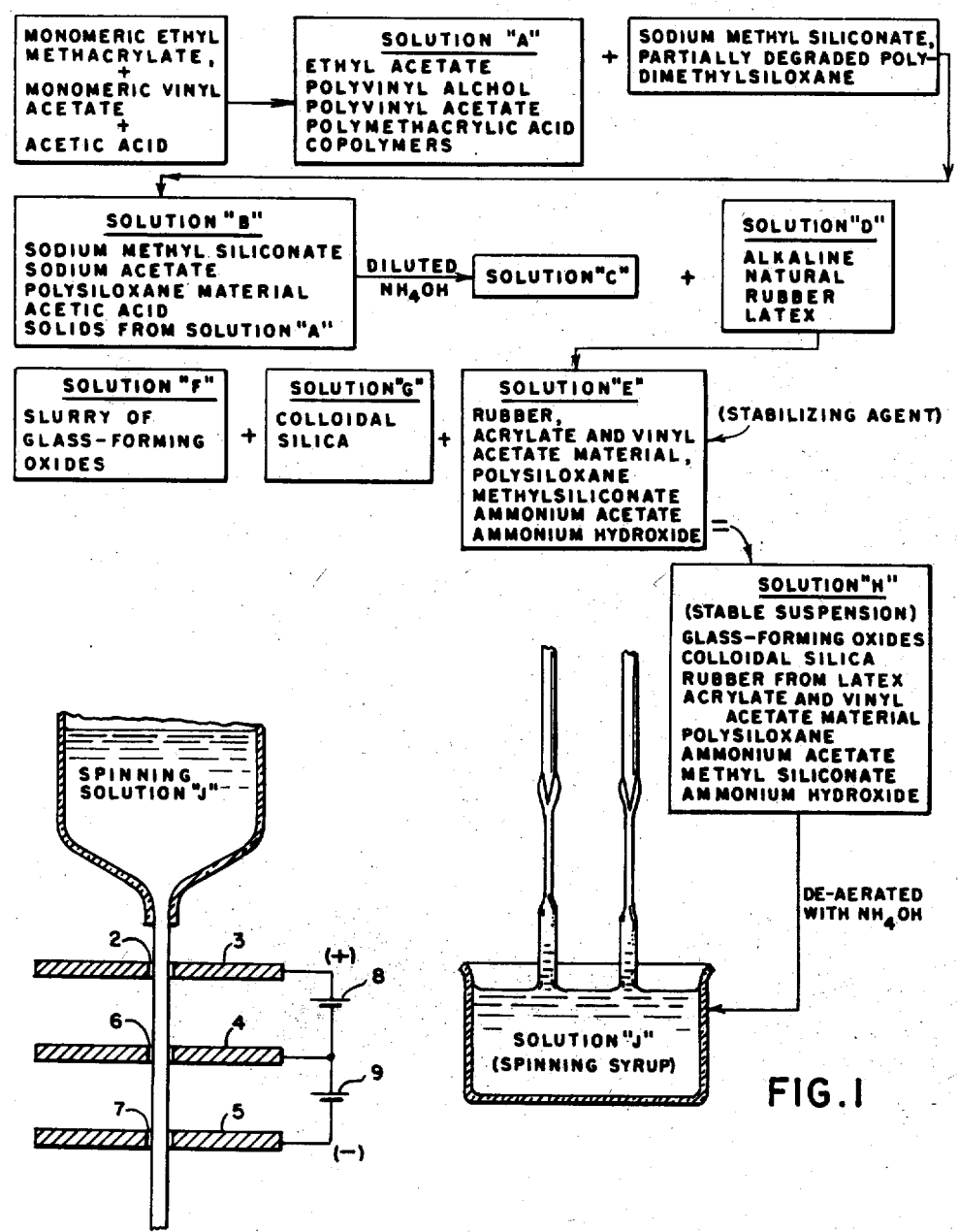

2,908,545

SPINNING NONFUSED GLASS FIBERS FROM AN AQUEOUS DISPERSION

Jayanti D. Teja, Whitestone, N.Y., assignor to Montecatini, Società Generale per l'Industria Mineraria e Chimica, a corporation of Italy Original application May 25, 1955, Serial No. 511,131. Divided and this application May 25, 1955, Serial No. 511,132

4 Claims. (Cl. 18—54)

This invention relates to the preparation of mineral fibers from aqueous solutions.

This application is a division of an application entitled "Preparation of Glass-Like Materials From Aqueous Silica Systems by Polymerization and Contemporaneous Dehydration," filed by Jayanti D. Teja on May 25, 1955, Serial No. 511,131.

Heretofore, gelatinous filaments have been prepared from aqueous mixtures of inorganic components. However, such filaments have generally been of large diameter, highly hydrated, porous, and/or of low tensile strength.

In the development of the present invention, it was observed that much of the crystallographic observations can be correlated with a theory of close packing of aggregates having a random distribution of characteristics. It was also observed that the interfacial characteristics of a heterogeneous system could be modified by obtaining a dynamic balance between somewhat opposing tendencies, and that heterogeneous systems involving water soluble silica were especially responsive to a control of the characteristics of the interface in the heterogeneous systems.

Heretofore catalyst beads have been prepared by allowing a mixture of aqueous solutions comprising sodium silicate type of materials to mix in a stream which is transformed into a highly hydrated gelatinous mixture. By similar procedures, highly hydrated gelatinous filaments have been prepared previously from solutions of sodium silicate. In such procedures of forming high molecular weight material, the water of hydration of the lower molecular weight components is to a considerable extent incorporated in the higher molecular weight material.

In accordance with the present invention water is desorbed during the increase in molecular weight, whereby relatively anhydrous or unhydrated higher molecular weight material is obtained. A theory of proton transfer is believed to account for the simultaneous dehydration and increase of molecular weight. A point charge can be introduced into certain aqueous systems prepared in accordance with the present invention, and a glass fiber withdrawn from the system. As the glass fiber is withdrawn from the solution, new glass is formed at the point of withdrawal of the glass fiber from the aqueous suspension, the glass being substantially completely dehydrated not by evaporation, but instantaneously by a chain reaction of proton transfer.

In the preferred method of preparing glass fibers in accordance with the present invention, three aqueous mixtures are prepared, one containing a mixture of glass forming (relatively insoluble in water) metal oxides, another a suspension of silica particles, and the third a transforming or stabilizing agent. Without the transforming agent, the mixture of suspended silica particles and metal oxides would tend to form a gelatinous composition quickly, but by reason of the transforming agent, only a part of the components are polymerized and the polymerization is arrested at a stage such that the transforming agent can keep the partially polymerized material suspended in the aqueous system as suspended particles. This suspension can be tested by density gradient procedures to establish that the mixture is a complex system comprising water, soluble silica, particles of metal hydroxides, suspended silica particles, suspended metal oxide particles, suspended small particles of polymerization product of silica and metal oxides, buffering components, and transforming agent. In this suspension, there is a dynamic balance conveniently described as an equilibrium amongst components of different molecular weight. The transforming agent helps to hydrate the particles and to maintain the dynamic equilibrium. The glass fibers are formed by proton transfer, there being substantially simultaneous dehydration and molecular weight increase of the glass at the point of withdrawal.

Numerous embodiments of the invention are possible in invention. Thus glass fibers can be prepared at moderate temperatures from aqueous systems. Proteins are prepared by the reaction of amino acids adsorbed on silica particles. Flexible plasticized films of sodium silicate are prepared. Other materials are secured together by binders consisting predominantly of inorganic materials, employing aqueous systems in applying such binders. Thus, the invention is broader than any of the specific products to be prepared thereby.

In the drawings:

Fig. 1 represents schematically the method of combining the various solutions disclosed herein and the formation of a glass fiber from the final solution by one method.

Fig. 2 represents schematically the method of forming a glass fiber by extrusion through an orifice in the presence of an electrostatic field.

Reference is made to the accompanying drawings and to a series of examples illustrating some of the chemistry and physics pertinent to the present invention.

EXAMPLE I

Mineral fibers having physical properties in some respects superior to those of glass fibers prepared from fused glass were prepared in accordance with the present invention. The glass fibers were drawn from a stabilized heterogeneous aqueous system briefly characterized as a syrup having a composition which, except for the presence of appropriate stabilizing agents, would have a tendency to form a gel at room temperature. The particles suspended in water may be glass frit, metal oxides, or the like, but the dynamic equilibrium between the soluble and dispersed solids is more easily understood in connection with a dispersion of gelatinous globules. It is even possible to form systems in which relatively large particles of siliceous hydrosol (highly hydrated metal oxides having the quasi-solid characteristics of a gel, gelatinous paste, or the like) are dispersed in an aqueous solution of silica, the stabilizing agent preventing gelation but permitting ion exchange between the large and dissolved particles. Particular attention was directed to the preparation of the stabilizing agent.

Commercially available grades of monomeric ethyl methacrylate and monomeric vinyl acetate were polymerized, copolymerized, reacted, and digested in an aqueous solution containing 35% acetic acid at 180° F. About 18 parts of each monomer are added to 70 parts of the acetic acid solution. There can then be decanted off a mixture containing about 30% by weight of solid reaction products. The reaction products are mainly ethyl acetate, polyvinyl alcohol, polyvinyl acetate, polymethacrylic acid and copolymers. This is designated as Solution A. Solution A with the above-named reaction products is formed by conventional operations, it being known that vinyl acetate polymerizes to polyvinyl acetate, which is partly hydrolyzed to polyvinyl alcohol, and ethyl methacrylate polymerizes to ethyl polymethacrylate, which forms polymethacrylic acid and ethyl acetate by saponification with the acetic acid solution. Also, there may occur hydrolysis of both polyvinyl acetate with aqueous acetic acid to polyvinyl alcohol, as well as hydrolysis of vinyl acetate to vinyl alcohol followed by polymerization thereof to polyvinyl alcohol. Moreover, ethyl methacrylate copolymerizes with vinyl acetate. The specific reaction and digestion conditions are not recited here since they are not critical for the purposes of producing Solution A, and any composition containing the components recited may be used as a stabilizing agent, according to the invention.

A mixture was prepared containing 85% of said Solution A, 1⅓% of a commercial solution of sodium methyl siliconate, and 12% of a partially degraded polydimethylsiloxane having a viscosity of 1000 centistokes. The commercial solution of sodium methyl siliconate contained about 22% ($CH_3SiO_{1.5}$) and 9.5% $Na_2O$, or about $32 \pm 2\%$ of $Na_3O_3SiCH_3$.

The mixture, designated Solution B, contained:

| | Percent |
|---|---|
| Sodium methyl siliconate—commercial solution | 1.33 |
| Sodium acetate | .11 |
| Polysiloxane material | 12.00 |
| Acetic acid | 29.50 |
| The solids from Solution A | 22.25 |
| Water (q.s.) | 33.92 |

Solution B was diluted with 25 volumes of water and then sufficient quantity of concentrated ammonium hydroxide was added rapidly with agitation to obtain a pH of 9.5. This was designated as Solution C.

Solution C was combined with an alkaline dispersion of natural rubber latex designated as Solution D, the mixture being Solution E. Sufficient latex solution (Solution D) to correspond, on a solids content basis, to 5 parts of solids, were added to sufficient Solution C to correspond to 3 parts of solids to form 8 parts (solids basis) of Solution E. The pH was kept constant at 9.5 by addition of ammonium hydroxide and agitation.

This mixture (Solution E) had a composition corresponding approximately to:

| | Percent |
|---|---|
| Rubber from latex | 3.2 |
| Acrylate and vinyl material | 1.3 |
| Polysiloxane material | 0.65 |
| Methylsiliconate material | 0.072 |
| Ammonium acetate | 1.5 |
| Three percent aqueous ammonium hydroxide solution | 92.25 |

This mixture (Solution E) can be conveniently designated as a stabilizing agent for a variety of systems.

A slurry was prepared from ground inorganic particles and water, and designated Solution F. The particles, which had a mean particle size of 35 microns, and a range of about 4 to 120 microns, about 60% being about 30 to 40 microns, and constituted about 90% of the slurry, were well mixed with the 10% water of the slurry. A commercial grade of opacifying frit, such as employed in the manufacture of porcelain enamel, was utilized. This ground mixture of glass-forming oxides was found to have an analysis as follows:

| | Percent |
|---|---|
| Zirconia | 45 |
| Zinc oxide | 22 |
| Boric oxide | 14 |
| Silica | 10 |
| Titania | 1.0 |
| Calcium fluoride | 3.3 |
| Aluminum oxide and magnesium oxide | 0.7 |
| Sodium oxide | 4.0 |

A colloidal solution of silica was prepared and designated as Solution G. Acetic acid was reacted with a solution of sodium silicate containing about one half mole of silica per mole of sodium oxide, or corresponding approximately to the formula $Na_4SiO_4$. An aqueous solution containing 36.8% $Na_4SiO_4$ was reacted with an equal weight of glacial acetic acid to form a mixture containing 9% colloidal silica, and this was purified by dialysis, much of the sodium acetate being withdrawn, and leaving the colloidal silica suspension. The silica content of the colloidal solution (Solution G) was about 9%, all of the silica being present in particles of less than about 1 micron in size. Although the diameters of the particles in Solution G were only about ⅟₃₅ of the diameters of the particles of Solution F, their volumetric size was only about 1/40,000 of the particles of Solution F.

As a demonstration of the gelation characteristics of the mixture of the slurry of powdered metal oxides and the solution of colloidal silica, a volume of the slurry was added slowly to two volumes of the colloidal silica, and the mixture set to a substantially irreversible gelatinous sol within an hour.

By the use of the stabilizing agent (Solution E) previously referred to, it was possible to prepare a solution retaining syrupy characteristics instead of being a gelatinous sol. Only less than about 2% of the stabilizing agent was necessary. The mixing of the slurry, the colloidal solution, and the stabilizing agent was conducted at about room temperature or about 70° F. Instead of adding the suspension of ground metal oxides to the colloidal silica solution, the colloidal solution of silica was added very rapidly, and with vigorous stirring, to half the volume of the slurry of ground metal oxides (Solution F), and immediately thereafter, while continuing the stirring, about 2% of the solution of the stabilizing agent (Solution E) was added, thereby forming a mixture (Solution H) having a composition about as follows:

| | Percent |
|---|---|
| Ground glass-forming metal oxides | 33.6 |
| Colloidal silica | 14.36 |
| Rubber (from latex) | 0.75 |
| Acrylate and vinylacetate material | 0.225 |
| Polysiloxane material | 0.113 |
| Ammonium acetate | 0.216 |
| Methyl siliconate | 0.012 |

Three percent solution of aqueous ammonium hydroxide, q.s. about 50.0.

A very remarkable phenomenon occurred promptly after the mixing of three solutions, F, G, and E. Within about 3 seconds, the mixture began to set to a gelatinous sol but instead of becoming a conventional gel, the material spontaneously reverted to a suspension within about 300 seconds, and thereafter was a stable suspension.

The mixture (Solution H) was de-aerated by bubbling the vapors of ammonium hydroxide through the mixture in a chamber having a pressure of about 700 mm. to form a spinning syrup (Solution J).

Glass fibers were formed from Solution J by a variety of procedures. In the simplest method, the point of a wood sliver (i.e., a toothpick) was placed in the solution and slowly withdrawn, thereby forming a glass fiber longer than one inch. The glass was both formed and dehydrated at the point of withdrawal of the fiber from the solution.

By examination under the microscope, it was observed that some of the fibers had a larger diameter than others, the range being 1 micron to 8 microns, but that many of the fibers had a diameter slightly smaller than the 5 micron glass fibers employed in decorative textiles. The glass fibers prepared from the aqueous solution had a tensile strength of about 250,000 to 410,000 pounds per square inch. Numerous other measurements of the fibers demonstrated that they were in many respects as good as fibers prepared by the conventional extrusion of fused glass. Instead of having the tendency to abrade, as fused glass fibers would, the fibers formed from Solution J had good surface characteristics, similar to those of a glass textile fabric after finishing to impart the feel and handle of an organic fabric. Under the stereoscopic binocular microscopic field, the fibers withdrawn from Solution J were fully as transparent as fused fibers, and were perfect cylinders and thus shown to be truly of the glassy state as distinguished from being of a gelatinous nature.

*Properties of the glass fibers prepared from Solution J*

| | |
|---|---|
| Color | Transparent. |
| Nature | Monofilaments. |
| Density | 2.58. |
| Diameter | Mean average 5 microns. |
| Tensile strength (dry and wet) | Range 250,000 to 410,000 p.s.i.; mean average 310,000 p.s.i. |
| Young's modulus | $21 \times 10^6$. |
| Softening point | 1950° F. |

The valuable results obtained by the present invention are independent of the theory of operation. The explanation proposed for the phenomenon is as follows:

Colloidal suspensions of silica, containing particles of silicic acid ($Si(OH)_4$), of diameters in the range 10 to 100 millimicrons, consist of amorphous silica particles with a high degree of surface hydration. As the particle size increases the degree of hydration decreases. The mechanism of growth is not well understood but should involve hydration and dehydration mechanisms. When colloidal silica, prepared from sodium metasilicate by acid hydrolysis, followed by dialysis, is induced to polymerize into high molecular weight polysilicic acid, the large particles of suspensoid that are formed tend to flocculate, sometimes forming threads and fibrils. The phenomenon can be traced to charge neutralization of the polysilicic acid nuclei. If in a colloidal silica medium, a metal oxide like FeO or CaO or $ZrO_2$ is suspended, and the pH is brought close to the point where the metal oxide tends to form the hydroxide, the metal ion enters the polysilicic acid aggregate. This could create structures like

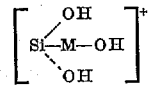

or

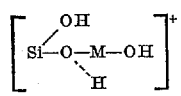

Such admission of metal ions at random into the polysilicic acid structure could take place preferentially under certain optimum conditions as embodied in the invention. Simultaneously adsorption of the metal ions could take place on the surface of the polysilicic acid particle thereby creating a more complex structure. Silicate glass may be produced by the coalescence of such particles in a true monofilament form.

In a suspension of mineral oxides, and colloidal silica, a network of polysilicic acid aggregates of the above kind may be created by addition of particular materials which tend to partially polymerize the silicic acid molecules and then arrest the polymerization reaction at a certain degree of polymerization, by tending to solubilize the resultant polymer molecules. In such a system the individual particles may be held together in a network by complex interfacial absorption phenomena which could be termed hydrogen bond formation. Alternately such systems could facilitate a high degree of proton transfer from particle to particle. Such proton transfer if induced by charge neutralization or reversal at any one point in the system, could result in a coalescing of the individual particles, through a process of dehydration in which the hydrogen ion (proton) carries away with it, during the process of transfer, the surface water of hydration or $OH^-$ groups as $H(HOH)_n$. This could result in $Si$—$O$—$Si$ bonds being formed between individual particles of the system. This necessarily happens in a 3-dimensional way. Hence if the point of charge neutralization is moved out of the system in a unidirectional fashion, a monofilament of silicate glass is formed.

EXAMPLE II

Glass fibers are prepared by extruding Solution J (Example I) through a metallic orifice into an electrostatic field, whereby the electrostatic field helps to impose an elongating force upon the fiber as it is formed. Fig. 2 illustrates the extrusion of a glass fiber 1 from Solution J through an orifice 2 in a metal plate 3. An electrostatic field is created around the fiber by means of condensers 4, 5 having openings 6, 7 through which the glass fiber passes. The condensers are connected with sources of power 8, 9 and with metal plate 3.

EXAMPLE III

Various modifications are made in the formulation of the various reactants and components utilized in preparing a spinning bath. It is desirable to utilize a very high molecular weight organic material dispersable in either alkaline or acidic aqueous systems, but animal glue, polyvinyl alcohol, polyethyleneimine, copolymers of styrene and maleic acid and related material can sometimes serve instead of vinyl and acrylate materials. Best results are obtained with materials which by intrinsic viscosity measurements possess an average molecular weight in excess of 10,000 to 100,000, and which contain a sufficient number of water solubilizing groups to provide one water solubilizing group per 80 of the high molecular weight organic material.

Formic acid, propionic acid, nitrous acid, and other acidic materials can be employed instead of acetic acid in preparation of the dispersion of high molecular weight material. Similarly volatile bases, such as methylamine, ethylene diamine, and piperazine can be employed instead of ammonia.

Instead of using exactly 1⅓% methyl siliconate in the preparation of Solution B, a wide range of concentrations is effective. Noticeable results are obtained using as little as 0.5% SC–50 (a commercial grade of sodium methyl siliconate sold by General Electric Company) and larger amounts up to 10% can be utilized with little disadvantage other than the cost thereof. In modifying the interfacial characteristics of heterogeneous silica systems, organo-siliconic acids and their salts possess remarkable advantages and flexibility. Just as emulsifying agents are among the important aids for stabilizing oil in water suspensions, so are the organo-siliconic acids among the important aids for stabilizing suspensions of silicates. Potassium methyl siliconate may be used instead of the sodium salt. Salts of ethyl siliconic acid, isopropylsiliconic acid, and even phenyl-siliconic acid and other organosiliconic acids are of interest, but are generally less effective than the corresponding methyl siliconates. The alkaline hydrolysis products of diorgano polysiloxanes, although helpful supplements, are not suitable substitutes for the organosiliconates. None of the sodium silicates or water soluble silicates, even though present in relatively large amounts, can provide the modification of the interface of a silica particle and water which characterizes the organosiliconates. Other low molecular weight organosilicon compounds stable at a pH of about 13 are of some value in combination with organosiliconates.

Instead of using 1000 centistoke polydimethyl-siloxane oil in the preparation of Solution B, a variety of relatively high viscosity, relatively high molecular weight, relatively hydrophobic materials may be utilized. The copolymer formed by subjecting substantially equal parts of hexamethyltrisiloxane, terephthalic acid, and sorbitol to elevated temperature acidic polymerization condition is suitable.

Other copolymers of alkyds, phenolic resins and silicones are suitable. The commercially available resins characterized as alkyd-silicone copolymers are suitable. Commercially available materials such as 807 sold by Dow Corning Corporation, or XR–878 can be used in lieu of the 1000 centistoke methyl silicone oil.

Advantages are obtained by utilizing a mixture of generally antagonistic components, whereby each component is able to assert its function in a balanced heterogeneous system. By the use of larger quantities of organic materials, somewhat similar results are attainable using copolymers designed to possess physical properties similar to the mixtures. Copolymers may be designed to possess physical properties similar to the mixtures. Copolymers of acrylic acids and esters and silicones, or vinyl alcohol, alkyds, silicones, and vinyl-siliconates, and other appropriate combinations might be useful in preparing a stabilizing agent capable of making an inorganic gel spontaneously revert to a stable suspension suitable for spinning of inorganic glass fibers.

In preparing Solution B from a mixture of high molecular weight organic materials, it is important to control the proportions in such a manner that Solution B is a syrupy suspension in strongly acid or strongly alkaline media, but has a much higher viscosity, approaching that of a hydrogel, at neutral pH. Ordinarily this result is obtained by the use of slightly more high molecular weight hydrophilic material than silicone material.

Synthetic rubber dispersions can be employed instead of natural rubber latex in preparing Solution D. Copolymers of vinyl chloride and acrylonitrile, copolymers of butadiene and acrylonitrile, compositions consisting predominantly of Hycar rubber, commercially available dispersions such as vinyl or vinylidene chloride resins, dispersions of starch ethers, starch esters, butyl acrylate dispersions, and related materials, are suitable for the preparation of Solution D. In general, Solution D must contain an organic material having an average molecular weight of at least 5,000 and a molecular weight of at least 200 per water solubilizing group. Thus Solution D is a dispersion of a hydrophobic material, as distinguished from Solution A, which is a dispersion of a hydrophilic material having a molecular weight greater than about 10,000, and having a water solubilizing group for each molecular weight of about 80, and capable of remaining in aqueous suspension as a syrup at either strongly alkaline or strongly acidic conditions, but tending to form a gelatinous material at neutral pH. In the preparation of Solution F, and again in the preparation of Solution H, the composition is such that gelatinous materials can be obtained unless the speed of mixing, order of mixing, and temperature are properly controlled to obtain compositions which are stable dispersions instead of gels.

In preparing Solution F, it is important to control the particle size of the metal oxides within the range of from about 30 to 40 micron size. The spinning solution (Solution J) must contain from about 15% to 75% solids of the metal oxides derived from Solution F. Any of the metal oxides customarily used in glassmaking can be utilized, but in order to form high strength glass fibers, it is important to control the concentration of sodium oxide, potassium oxide, lithium oxide, and related alkaline oxides to small amounts, desirably less than 4% of the metal oxide composition, and certainly less than 10%. Other components can vary with even greater flexibility than is possible in conventional glass making. Substantially pure silica fibers can be prepared, but the cost of grinding pure silica to the correct particle size, desirably 35–50 microns, is greater than the cost of grinding other metal oxides. It is commercially convenient to utilize glass frit, such as employed in manufacturing porcelain enamel, but it is not necessary to preform the glass. Instead, the separate metal oxides, such as zirconia and titania can be ground to the correct particle size and mixed to form the spinning solution. The glass fibers formed from a properly well-prepared spinning solution have a composition resulting from the components used.

Obviously many other modifications of the pioneer invention are possible, and the above examples merely illustrate some of the advantageous results from preparing high molecular material by the use of the present invention.

The invention claimed is:

1. The method of preparing a non-fused glass fiber at room temperature from a stable heterogeneous aqueous syrup, which includes the steps of mixing at room temperature an aqueous slurry containing dispersed particles of glass-forming metal oxides having maximum dimensions within the range from 5 to 140 microns with a smaller amount of a solution containing colloidal silica particles having maximum dimensions less than about 1 micron, said slurry containing a still smaller amount of soluble silica, adding to the resulting mixture less than approximately 2% by weight based on the metal oxide particles of a stabilizing mixture comprising an organosiliconate, an organic hydrophilic material and an organic hydrophobic material, said hydrophilic material having a molecular weight greater than about 10,000 by intrinsic viscosity measurements and containing sufficient water solubilizing groups to provide one of said water solubilizing groups per about 80 groups of said hydrophilic material and containing ethyl acetate, polyvinyl alcohol, polyvinyl acetate, polymethacrylic acid and copolymers thereof, said hydrophilic material being capable of remaining in aqueous suspension as a syrup at either strongly alkaline or strongly acidic conditions but tending to form a gelatinous material at neutral pH, said organic hydrophobic material having a molecular weight greater than 5,000 by intrinsic viscosity measurements, and having a molecular weight of at least about 200 for any solubilizing groups and being a dispersion selected from the group natural rubber latex, synthetic rubber, copolymers of vinyl chloride and acrylonitrile, copolymers of butadiene and acrylonitrile, vinyl resins, vinylidene chloride resins, starch ethers, starch esters, and butyl acrylate; de-aerating the resulting stabilized suspension to form said heterogeneous aqueous syrup, introducing a pointed body into the aqueous syrup, withdrawing the body from the upper surface of the aqueous syrup so that the pointed portion of the body is the last portion withdrawn, continuing the withdrawal of the pointed body away from the syrup, whereby a glass fiber is formed by dehydrative aggregation near the point of withdrawal from the syrup, one end of said glass fiber being weakly adhered to the pointed portion of the pointed body.

2. The method of preparing a non-fused glass fiber at room temperature from a stable heterogeneous aqueous syrup which includes the steps of mixing at room temperature a dispersion of glass-forming metal oxides having a particle size within the range from 5 to 140 microns with a dispersion of colloidal silica having a particle size less than 1 micron, adding to the resulting mixture less than 2% by weight based on the metal oxide particles of transforming agent comprising about 3.2% rubber from latex, about 1.3% acrylate and vinyl material comprising polyvinyl alcohol, polyvinyl acetate, polymethacrylic acid and copolymers, about 0.65% polysiloxane material, about 0.072% methyl siliconate material, about 1.5% ammonium acetate, and about 92.25% of a three percent aqueous ammonium hydroxide solution, extruding a fine diameter stream of said solution into a gas space to bring about dehydrative aggregation near the point of withdrawal of the stream from the solution into the gas space, whereby a glass fiber is formed.

3. The method of preparing a glass fiber at room temperature from a stable heterogeneous aqueous syrup which includes the steps of mixing at room temperature a dispersion of glass-forming metal oxides having a particle size within the range from 5 to 140 microns with a dispersion of colloidal silica having a particle size less than 1 micron, adding to the resulting mixture less than 2% by weight based on the metal oxide particles of transforming agent comprising about 3.2% rubber from latex, about 1.3% acrylate and vinyl material comprising polyvinyl alcohol, polyvinyl acetate, polymethacrylic acid and copolymers, about 0.65% polysiloxane material, about 0.072% methyl siliconate material, about 1.5% ammonium acetate, and about 92.25% of a three percent aqueous ammonium hydroxide solution, extruding a fine diameter stream of said solution into a gas space to bring about dehydrative aggregation near the point of withdrawal of the stream from the solution into the gas space, whereby a glass fiber is formed, and surrounding said glass fiber thus formed with an electro-static field to exert lines of force generally parallel to the linear dimension of the glass fiber.

4. A glass fiber having a Young's modulus of 21,000,000 pounds per square inch, a softening point of about 1950° F., a zirconia content of at least one-third, a non-abrasive surface, and resulting from the formation of the glass fiber by the method of claim 2.

References Cited in the file of this patent

UNITED STATES PATENTS

| Re 24,060 | Russell | Sept. 6, 1955 |
| 2,133,236 | Slayter | Oct. 11, 1938 |

FOREIGN PATENTS

| 512,292 | Great Britian | Aug. 31, 1939 |

OTHER REFERENCES

Ser. No. 225,586, Skaupy et al. (A.P.C.) published June 8, 1943.

Fiberglas Standards D1.2.1, page 2, June 1, 1944. Published by Owens-Corning Fiberglas Corp., Toledo, Ohio. Copy in Div. 15.